(12) United States Patent
Möglich

(10) Patent No.: US 6,811,631 B2
(45) Date of Patent: Nov. 2, 2004

(54) DEVICE AND METHOD FOR WELDING THIN-WALLED WORK PIECES USING ULTRASOUND

(75) Inventor: Hartmut Möglich, Karlsbad (DE)

(73) Assignee: Herrmann Ultraschalltechnik GmbH & Co. KG, Karlsbad-Ittersbach (DE)

( * ) Notice: Subject to any disclaimer, the term of this patent is extended or adjusted under 35 U.S.C. 154(b) by 0 days.

(21) Appl. No.: 10/400,694

(22) Filed: Mar. 28, 2003

(65) Prior Publication Data

US 2004/0031554 A1 Feb. 19, 2004

(30) Foreign Application Priority Data

Mar. 30, 2002 (DE) .......................................... 102 14 405

(51) Int. Cl.[7] .............................................. B29C 65/08
(52) U.S. Cl. ................. 156/73.1; 156/308.4; 156/580.2
(58) Field of Search ............................. 156/73.1, 308.2, 156/308.4, 580, 580.1, 580.2, 581, 583.1

(56) References Cited

U.S. PATENT DOCUMENTS

| 4,517,790 A | * | 5/1985 | Kreager | ....................... 53/552 |
|---|---|---|---|---|
| 4,529,473 A | * | 7/1985 | Mims | ....................... 156/580.2 |
| 4,534,818 A | * | 8/1985 | Kreager et al. | ............. 156/466 |
| 4,909,871 A | * | 3/1990 | Todo et al. | ................. 156/73.1 |
| 5,906,694 A | * | 5/1999 | Duly | ........................ 156/73.3 |
| 6,562,166 B2 | * | 5/2003 | Molander et al. | .......... 156/73.1 |

* cited by examiner

*Primary Examiner*—James Sells
(74) *Attorney, Agent, or Firm*—Paul Vincent

(57) ABSTRACT

A device (10) for welding thin-walled work pieces (52) such as e.g. food containers of foil, fibrous web or foil-fibrous web composites using ultrasound has at least two components, i.e. a sonotrode (12) and a counter tool (14) for the sonotrode (12). One component (12) has a working region (16) which faces a working region (18) of the other component (14). The working region (18) of one component (14) comprises at least one projection (41) and the working region (16) of the other component (12) comprises at least one recess (46) into which the projection (41) can engage during the welding process. In this manner the work piece is securely held without slippage.

9 Claims, 4 Drawing Sheets

DEVICE AND METHOD FOR WELDING THIN-WALLED WORK PIECES USING ULTRASOUND

BACKGROUND OF THE INVENTION

The invention concerns a device for welding thin-walled work pieces such as e.g. food containers made from foil, fibrous web, or foil-fibrous web composites using ultrasound, the device comprising at least two components, i.e. a sonotrode and a counter tool for the sonotrode, wherein one component comprises a working region which faces a working region of the other component, at least during the welding process.

A device of this type is known from DE 100 27 735 A1 (assigned to the assignee of the instant invention), which describes an ultrasound-welding device comprising a sonotrode and an opposing support (also called anvil). The sonotrode and the opposing support each have working edges between which the work piece to be welded is clamped during the welding process.

The conventional device is mainly used to produce containers for food such as e.g. milk, juices, etc. During welding, the maximum temperature is achieved in that region of the work piece to be welded where the amplitude and the mechanical pressure of the ultrasound waves introduced into the work piece reach their maximum. The sonotrode thereby couples the ultrasound energy into the work piece.

It is the object of the present invention to further develop a device of the above-mentioned type such that the welding seams produced thereby are of consistently high quality and density from work piece to work piece.

SUMMARY OF THE INVENTION

A device of the above-mentioned type achieves this object in that the working region of one component has at least one projection and the working region of the other component has at least one recess into which the projection can engage during the welding process.

In the inventive device, the sonotrode and the counter tool securely hold the work piece to be welded in a fixed position relative to the sonotrode and the counter tool during the welding process. This prevents the work piece from being displaced relative to the working regions of the sonotrode and/or the counter tools during the welding process, in a simple and inexpensive fashion.

Such a displacement of the work piece tends to occur; in particular, when the containers are filled with liquid, since during filling of the liquid into the containers in the filling device the container outer wall is always moistened with the liquid being filled which makes the surface of the work piece "slippery". This reduces the friction between the work piece and the working regions of the sonotrode and the counter tool abutting the work piece, and has conventionally impeded secure holding of the work piece to be welded by the sonotrode and the opposing support. If the work piece is displaced during the welding process, the energy is coupled into a larger material region, which can produce a leaking welding seam.

During the welding process, the projection and the recess on the sonotrode or counter tool deform, clamp and thereby securely fix a region of the work piece directly adjacent to the region to be welded. Even for work pieces with smooth and/or slippery surfaces, reproducible welding seam quality is guaranteed. It is thereby clear that the dimensions of the projection and of the recess are matched such that a gap between the wall of the projection and the wall of the recess is produced in which the container wall can be received without being damaged. Additional tensioning and clamping means are not required for holding the work piece. This reduces the price of the inventive device and facilitates cleaning since fewer overall parts are required and no additional undercuts are produced. Since the work piece is safely held relative to the sonotrode and the counter tool, smooth welding lines can also be realized. Additional introduction of contours in the welding region is therefore not required.

Advantageous further developments of the invention are recited in the dependent claims.

In a first preferred embodiment of the inventive device, at least one projection is provided on the counter tool and at least one recess is provided on the sonotrode. This is advantageous for manufacture and produces optimum energy performance of the sonotrode in the region of the work piece to be welded.

A further development proposes that the working region of the counter tool has a cosmetic seam region and a sealing seam region and that the projection is disposed between the cosmetic seam region and sealing seam region. This arrangement provides the finished welded work piece with a particularly attractive visual appearance. At the same time, the region of the work piece, which is held by the sonotrode and the counter tool, is directly adjacent to the actual seam regions such that the welding quality of both seam regions is highly reproducible.

Advantageously, at least one projection is formed as a bridge, which extends along the longitudinal extension of one component, with at least one recess being formed as a groove which extends along the longitudinal extension of the other component and which is complementary to the bridge. The bridge and the groove preferably extend along the entire length of the sonotrode and the counter tool. This guarantees optimum clamping of the work piece between the sonotrode and the counter tool during welding. Alternatively, at least one pin may be provided instead of the bridge and/or at least one hole may be provided instead of the groove.

In a particularly advantageous fashion, the projection is disposed on a part which is separate from the rest of the component and which can be exchanged. This takes into consideration the fact that the projection is worn with time by the numerous clamping processes which such a welding device must perform. The inventive further development permits easy and inexpensive replacement of the projection without having to replace the entire component. This reliably prevents damage during the clamping process.

It may be advantageous to production when the projection is integrated in the component as a single piece. The stability of the projection is also particularly good in this further development of the inventive device.

In one embodiment of the inventive device, the projecting end of the projection and/or the edge of the recess has an insertion bevel. This insertion bevel(s) prevent(s) damage to the work piece to be processed when a region adjacent to the region to be welded is clamped between the sonotrode and the counter tool.

The invention also concerns a method for welding thin-walled work pieces through ultrasound such as e.g. food containers of foil, fibrous web or of foil-fibrous web composites, wherein the work piece is disposed between the working regions of two components, namely a sonotrode and a counter tool, wherein the working regions face each other at least during the welding process.

To guarantee the quality of the welding seam between the two work pieces which is produced by this method, i.e. such that it is reproducible, the invention proposes loading and deforming a region of the work piece during the welding process using a projection which is provided on one component and which engages in a recess provided on the opposite component.

BRIEF DESCRIPTION OF THE DRAWING

Embodiments of the invention are explained below with reference to the enclosed drawing.

DESCRIPTION OF THE PREFERRED EMBODIMENTS

Figure 1:
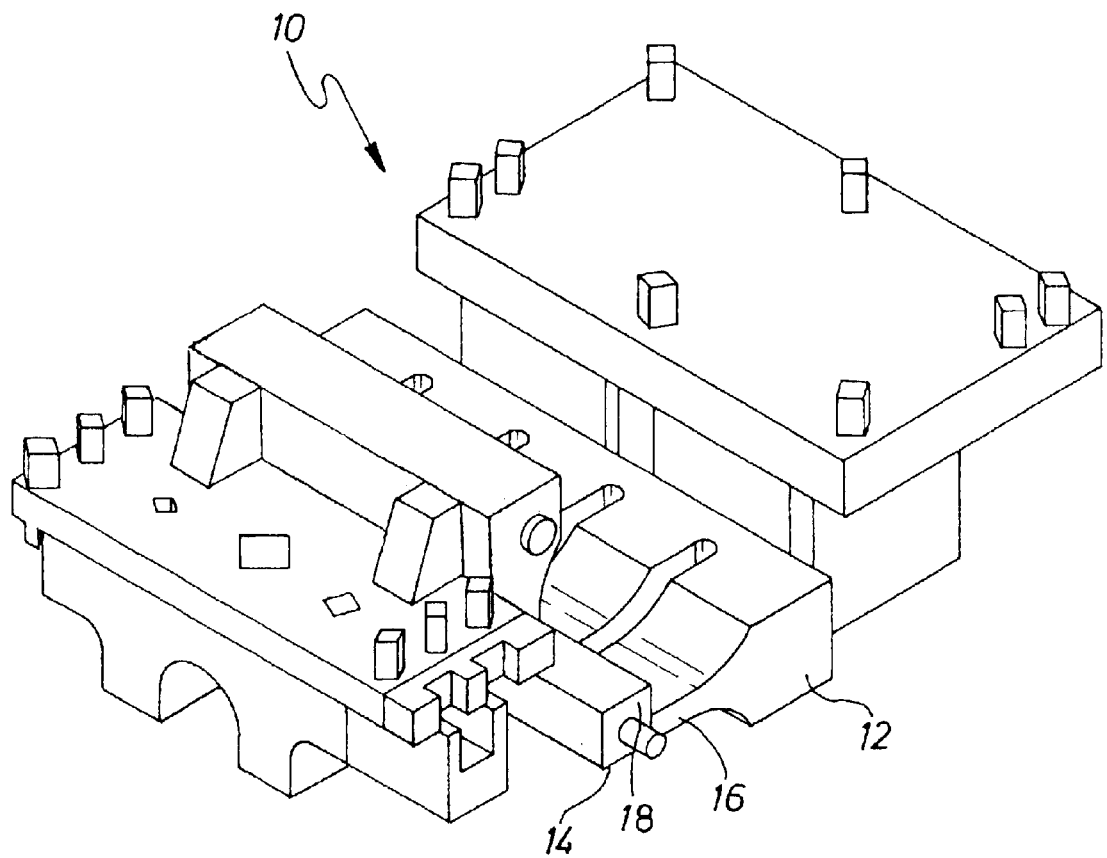
FIG. 1 shows a perspective view of a device for welding thin-walled work pieces using ultrasound and having a sonotrode and a counter tool.
Figure 2:
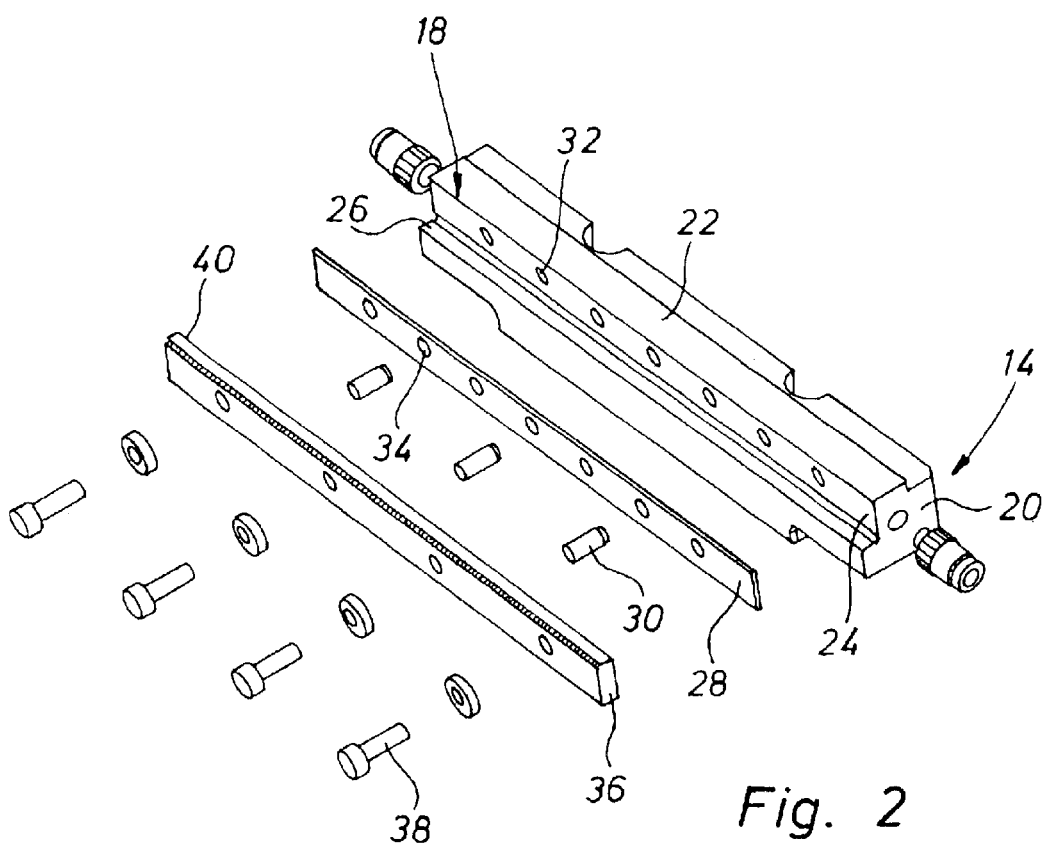
FIG. 2 shows a perspective exploded view of the counter tool of FIG. 1.

FIG. 1 shows a device for welding thin-walled work pieces, designated in its entirety with reference numeral 10. This device welds e.g. food containers that are filled with a liquid, via ultrasound and thereby tightly seals them. Towards this end, the device 10 has a sonotrode 12 and a counter tool 14 which is also referred to as an "anvil". The sonotrode 12 comprises a working region 16, and the anvil 14 has a working region 18. Both working regions are flat and face each other. The exact configuration of the working regions 16 and 18 of sonotrode 12 and anvil 14 is explained in more detail with reference to FIGS. 2 through 4.

The anvil 14 comprises a basic body 20, which has an overall approximately rectangular, longitudinal structure. When installed, its side facing the sonotrode 12 has a first opposing support surface 22, which is in total flat and slightly raised. It is limited by a side surface 24 which extends at a right angle to the opposing support surface 22 and which is part of a step 26.

Figure 4:
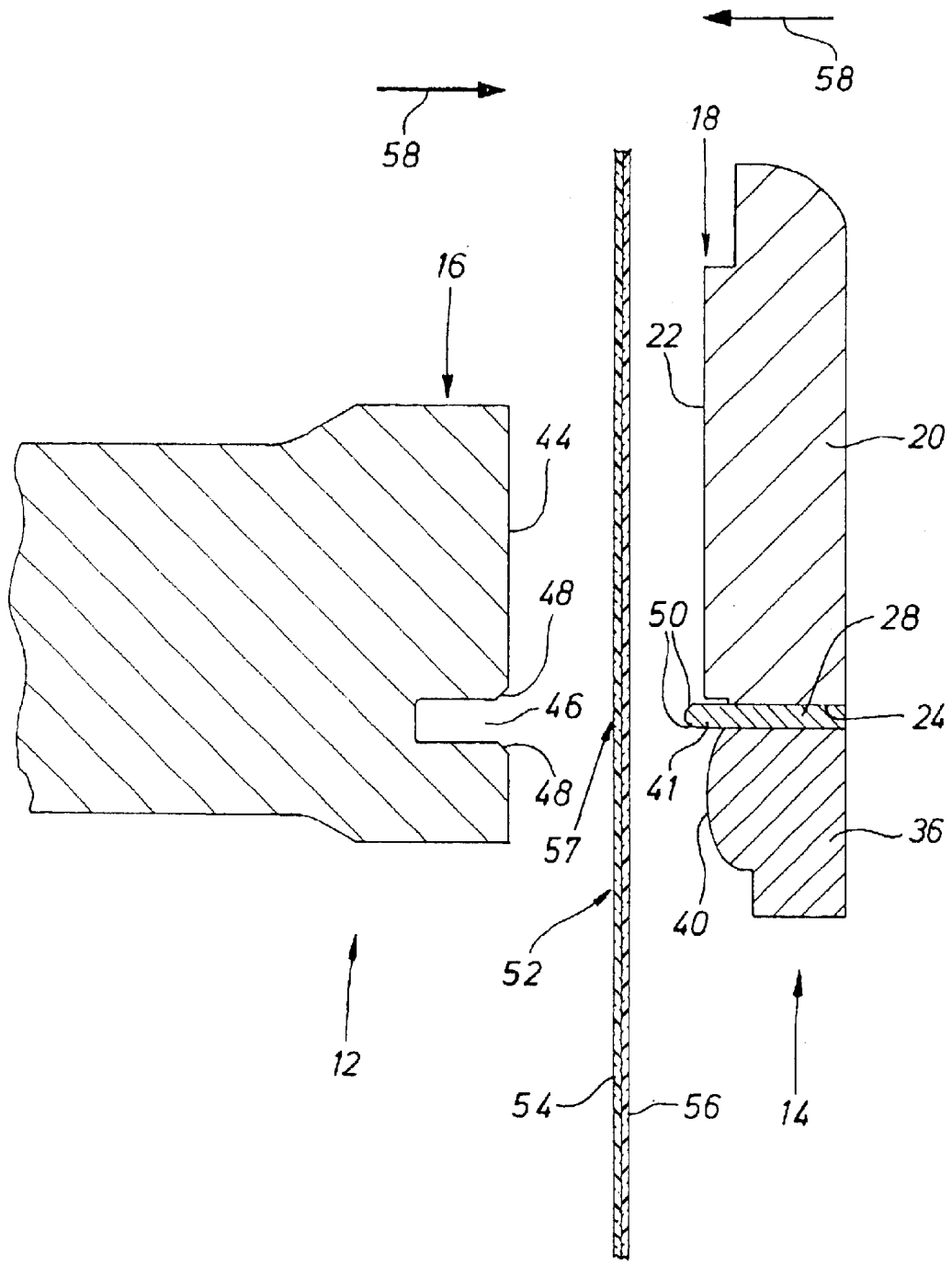
FIG. 4 shows a cross-section through the sonotrode of FIG. 3 and the counter tool of FIG. 2 in the installed position with an interposed region of a work piece to be welded.

A sheet metal plate 28 is inserted into the step 26 and positioned on the basic body via pins 30. In the installed position, a region of the sheet metal plate 28 flatly abuts the side surface 24 of the basic body 20 of the anvil 14. The pins 30 are introduced into corresponding bores 32 and 34 of the side surface 24 and of the sheet metal plate 28. FIG. 4 shows that, when installed, the sheet metal plate 28 protrudes slightly past the first opposing support surface 22 to form a projection 41.

A strip-like element 36 is disposed on the side of the sheet metal plate 28. It is fastened by screws 38 in threaded bores in the side surface 24 of the basic body 20. In this fashion, the sheet metal plate 28 is clamped between the strip-like element 36 and the basic body 20. The strip-like element 36 has a second opposing support surface 40 which also faces the sonotrode 12 when installed but which, in contrast to the first opposing support surface 22, is curved in a convex manner. The axis of curvature is thereby parallel to the longitudinal axis of the anvil 14. The projection 41 of the sheet metal plate 28 protrudes past the "highest" point of the second opposing support surface 40. The highest point of the second opposing support surface 40 is slightly offset with respect to the plane of the first opposing support surface 22 (approximately 0.1 mm).

The sonotrode 12 has a central region 42 which, when installed, tapers towards the working region 16 facing the anvil 14. The working region 16 of the sonotrode 12 is delimited towards the anvil 14 by a completely flat working surface 44. It contains a rectangular groove 46 which is slightly offset relative to its central axis, and which extends in the longitudinal direction. Each edge of the groove 46 adjacent to the working surface 44 of the sonotrode 12 has one insertion bevel 48. Analog thereto, the projecting end of the projection 41 of the sheet metal plate 28 has corresponding bevels 50. The width of the groove 46 is slightly larger than the thickness of the projection 41. Moreover, the groove 46 is deeper than the projection of the sheet metal plate 28 past the opposing support surfaces 22 or 40 i.e. deeper than the height of the projection 41.

The device 10 works as follows: The working region 16 of the sonotrode 12 is initially separated from the working region 18 of the anvil 14. A region 52 of a container (not shown in detail), which is filled with food, is introduced into the gap between the sonotrode 12 and the anvil 14. It consists of two closely adjacent layers 54 and 56 of a foil, a fibrous web or a foil-fibrous web composite. The cavity (not shown), which receives the food, is located in FIG. 4 below the region 52.

The anvil 14 and the sonotrode are moved towards each other (arrows 58) until the region 52 is clamped between the sonotrode 12 and the anvil 14. The projection 41 on the sheet metal plate 28 thereby presses a region 57 of the region 52 of the food container into the groove 46, which is thereby deformed in a crimped manner. The gap between the projection 41 and the wall of the groove 46 (i.e. the "play" between the projection 41 and the groove 46) is sufficiently large that the material of the region 57 is not damaged. In this fashion, the region 52 is securely fixed relative to the anvil 14 and the sonotrode 12 even when its outer side is possibly contaminated by liquid food.

When the sonotrode 12 is oscillated with a frequency in the ultrasound region, the zones of the work piece loaded with pressure experience an extreme temperature increase. The two layers 54 and 56 thereby melt in the region of the opposing support surfaces 22 and 40. A so-called "cosmetic seam" is produced in that region which is clamped between the working surface 44 of the sonotrode and the first opposing support surface 22 of the anvil 14. The actual sealing seam is produced in that region that is clamped between the working surface 44 and the second opposing support surface 40. After welding, the anvil 14 and the sonotrode 12 are withdrawn in opposition to the direction of the arrows 58. The region 52 of the food container is released and the welded container can be removed from the device 10.

Figure 6:
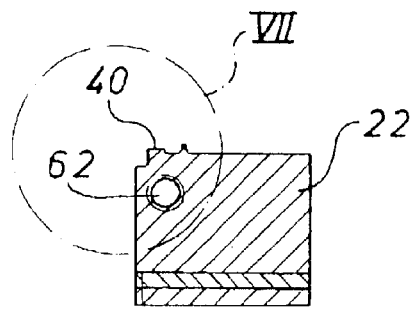
FIG. 6 shows a sectional representation along the line VI—VI of FIG. 5.
Figure 7:
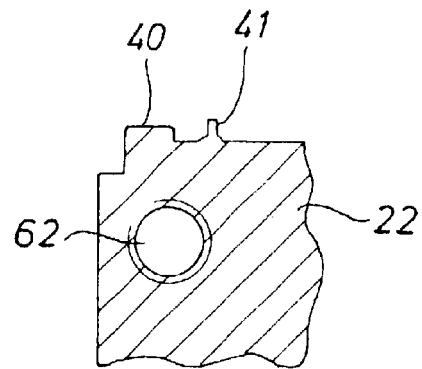
FIG. 7 shows a detailed illustration VII of FIG. 6.
Figure 5:
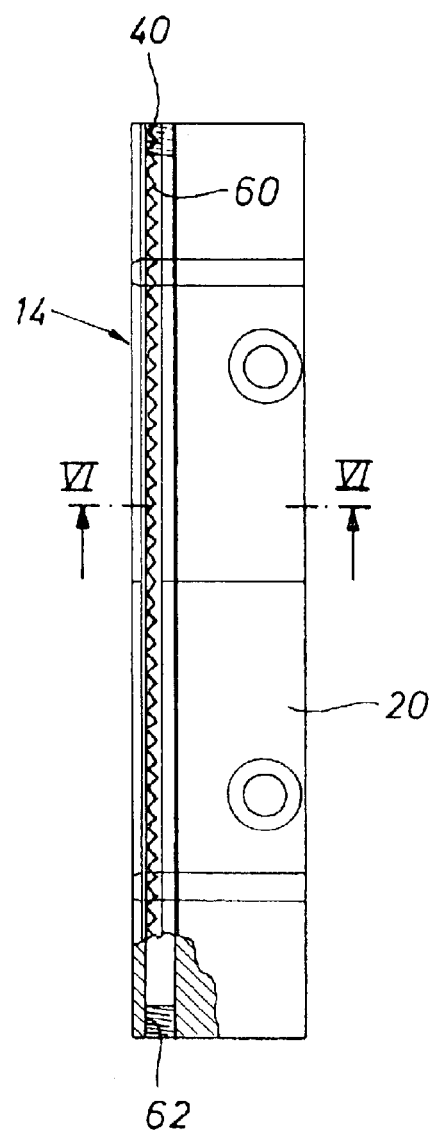
FIG. 5 shows a top view onto an alternative embodiment of a counter tool.

FIGS. 5 through 7 show an alternative embodiment of an anvil 14. Parts and regions that have equivalent functions to parts and regions of the above-described anvil 14 have the same reference numerals and are not explained again in further detail.

Figure 3:
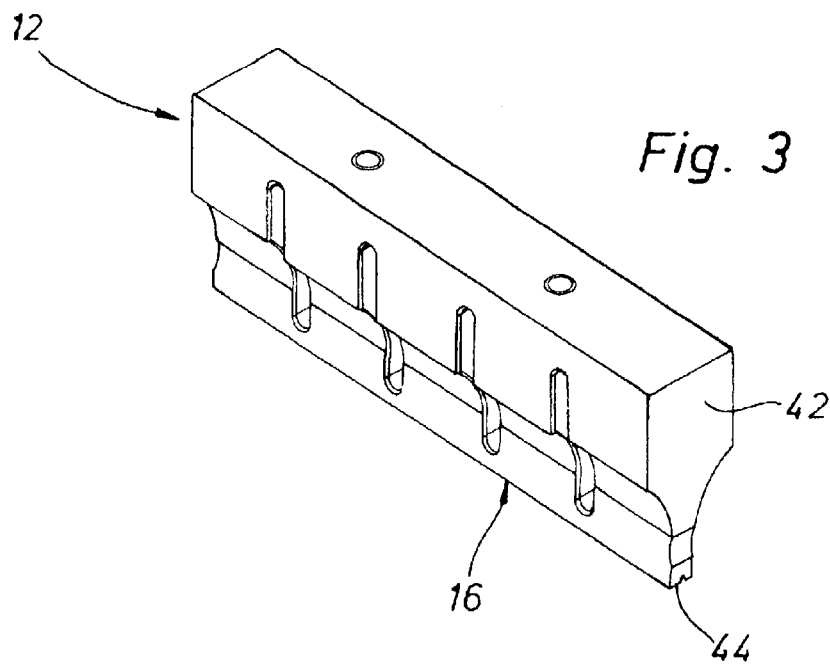
FIG. 3 shows a perspective view of the sonotrode of FIG. 1.

In contrast to the anvil 14 shown in FIGS. 3 through 4, the anvil 14 shown in FIGS. 5 through 7 has only one single opposing support surface 40. It has zigzagged elevations 60 which are disposed in a row.

During operation, it simultaneously produces a sealing seam and a cosmetic seam. Instead of a separate sheet metal plate, the anvil 14 shown in FIGS. 5 through 7, has a bridge 41 integral with the basic body 20 of the anvil 14. Moreover, a coolant channel 62 extends through the basic body 20.

Figure 8:
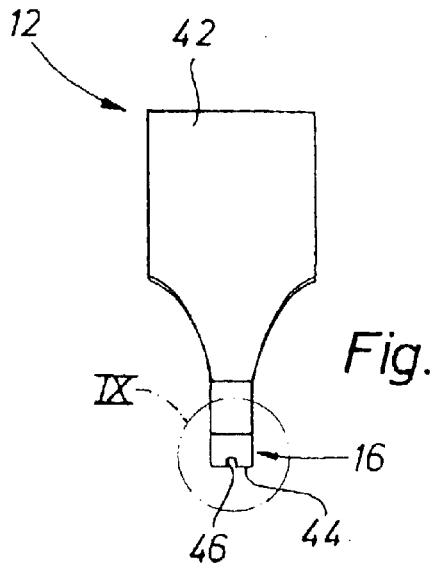
FIG. 8 shows a side view of an alternative embodiment of a sonotrode.
Figure 9:
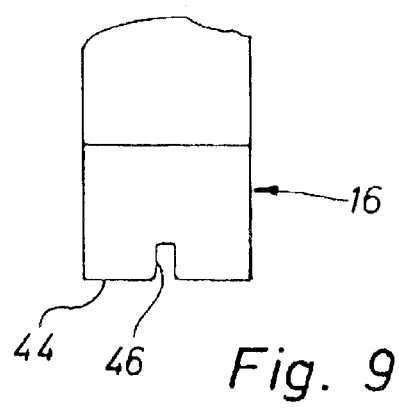
FIG. 9 shows a detail IX of FIG. 8.

FIGS. 8 and 9 show an alternative embodiment of a sonotrode 12. In this case as well, those parts and regions having equivalent functions to the parts and regions of the above-described sonotrode 12 have the same reference numerals. The sonotrode 12 shown in FIGS. 8 and 9 primarily differs with regard to the position of the groove 46: It is disposed opposite to the longitudinal axis of the sonotrode 12, in a central, non-eccentric manner.

I claim:

1. A device for welding thin-walled work pieces such as food containers of foil, fibrous web or foil-fibrous web composites using ultrasound, the device comprising:
    a first component having a first working region said first component having at least one recess disposed in said first working region, and
    a second component having a second working region facing said first working region of said first component, said second component having at least one projection disposed on said second working region to engage into said recess during welding, wherein said projection and said recess are structured and dimensioned to deform, clamp, and securely fix a region of the work piece without damaging the work piece.

2. The device of claim 1, wherein said first component is a sonotrode and said second component a counter tool.

3. The device of claim 2, wherein said second working region of said counter tool comprises a cosmetic seam region and a sealing seam region, wherein said projection is disposed between said cosmetic seam region and said sealing seam region.

4. The device of claim 1, wherein said at least one projection is formed as a bridge extending along a longitudinal travel of said second component and said at least one recess is a groove which extends along a longitudinal travel of said first component and which is complementary to said bridge.

5. The device of claim 1, wherein said projection is disposed on a part which is separate from rest of said second component and which can be exchanged.

6. The device of claim 1, wherein said projection is integrated in said second component as a single piece.

7. The device of claim 1, wherein at least one insertion bevel is provided on an end of said projection.

8. The device of claim 1, wherein a least one insertion bevel is provided on an edge of said recess.

9. A method for welding thin-walled work pieces such as food containers of foil, fibrous web or foil-fibrous web composites using ultrasound, the method comprising th steps of:
    disposing the work piece between a first and a second component, said first component having a first working region and at least one recess disposed in said first working region, said second component having a second working region facing said first working region of said first component, said second working region having a least one projection; and
    loading the work piece with said projection and engaging said projection into said recess to weld the work piece, wherein said projection and said recess are structured and dimensioned to deform, clamp, and securely fix a region of the work piece without damaging the work piece.

* * * * *